UNITED STATES PATENT OFFICE.

LOUIS HAAS, OF HEIDELBERG, GERMANY, ASSIGNOR TO BADISCHE ANILIN AND SODA FABRIK, OF LUDWIGSHAFEN-ON-THE-RHINE, GERMANY, A CORPORATION.

SULFUR DYE AND PROCESS OF MAKING SAME.

No. 931,598.  Specification of Letters Patent.  Patented Aug. 17, 1909.

Application filed September 20, 1905. Serial No. 279,355.

*To all whom it may concern:*

Be it known that I, LOUIS HAAS, doctor of philosophy and chemist, citizen of the French Republic, residing at Heidelberg, in the Grand Duchy of Baden, German Empire, have invented new and useful Improvements in Sulfur Dyes and Processes of Making the Same, of which the following is a specification.

I have discovered that paranitroso-hydroxy compounds, such for instance as nitrosophenol (quinone-oxim), can be condensed with carbazol and that these condensation products, as well as their leuco compounds, can, by treatment with sulfur and alkali sulfid be converted into valuable coloring matters which substantively dye cotton deep blue. The nitroso-hydroxy compounds which can be used in carrying out this invention include nitroso-phenol, nitroso-orthocresol, ortho-chlor-para-nitroso-phenol, and similar bodies. The sulfur coloring matters obtainable by heating the condensation products with sulfur and alkali sulfid possess excellent properties being very stable against the action of washing, light and chlorin.

The following examples will serve to further illustrate the nature of my invention, which, however, is not confined to these examples. The parts are by weight.

Example 1.—Dissolve seventeen parts of carbazol in about ten times its weight of concentrated sulfuric acid and add, gradually, thirteen parts of nitroso-phenol, at the same time cooling so that the temperature does not rise above from thirty, to forty, degrees centigrade; then pour the reaction mixture onto ice and water and filter off the product which separates out in small scales having a metallic luster and soluble in acetone, yielding a reddish-violet solution. The compound can be either directly treated with alkali polysulfid, or it can first be converted into its leuco compound, for instance, by reduction with sodium sulfid and precipitation by means of acid.

The preparation of the coloring matter may be carried out as follows: Heat together, in an open vessel, at a temperature of from one hundred and fifty, to one hundred and sixty, degrees centigrade, thirty-five parts of the leuco compound obtainable as hereinbefore described, thirty-five parts of crystallized sodium sulfid and forty parts of sulfur, and continue the heating until the melt becomes hard. Allow the mass to cool, break it into small pieces and heat it for from two, to three, hours at a temperature of from one hundred and fifty, to two hundred and fifty, degrees centigrade. In this way is obtained a gray powder which is soluble in dilute sodium sulfid solution, such solution of the said powder being yellow and substantively dyeing cotton deep blue shades which are fast against the action of washing and chlorin. The coloring matter can, if desired be purified by dissolving it in alkali sulfid solution and precipitating it again by passing air through such solution thereof.

Example 2.—Dissolve fifty parts of carbazol in five hundred parts of concentrated sulfuric acid and add a solution of forty-two parts of nitroso-ortho-cresol in four hundred and fifty parts of concentrated sulfuric acid, at the same time cooling so that the temperature of the mixture does not rise above thirty degrees centigrade. Pour the deep blue reaction liquid onto ice and filter off the dark blue compound which separates out and wash it well with water. This compound, upon drying, is a dark powder with a metallic luster and is soluble in ether and in acetone (the solutions being red) and in chloroform (the solution being bluish-red). It dissolves in hot dilute sodium sulfid solution, such solution of the said compound being yellow and, by the addition of acid, it is precipitated in the form of its leuco compound.

Either the condensation product itself, or its leuco compound, may be used in the preparation of the sulfur coloring matters which may be prepared as follows:—Heat together, in an open vessel, at a temperature of from one hundred and fifty, to one hundred and sixty, degrees centigrade, fifty parts of the condensation product, obtainable as hereinbefore described, sixty parts of crystallized sodium sulfid and forty-five parts of sulfur, and continue heating until the mixture becomes dry. Allow the mass to cool and break it into small pieces, and then heat it for from two, to three, hours at a temperature of from one hundred and fifty, to two hundred and fifty, degrees centigrade. In this way a dark mass with a metallic luster is obtained. It is soluble in hot dilute sodium sulfid solution, such solution thereof being yellow and dyeing cotton dark violet which is stable against the action of washing and chlorin.

A procedure similar to the foregoing may be followed and similar condensation products and coloring matters be obtained if instead of nitroso-phenol, or nitroso-ortho-cresol, other para-nitroso-hydroxy compounds (such for instance as ortho-chlor-para-nitroso-phenol, or ortho-ortho-di-chlor-para-ni-troso-phenol) be employed.

Now what I claim is:

1. The process for the production of new sulfur coloring matters by condensing a para-nitroso-hydroxy compound with carbazol and heating the resulting condensation product with sulfur and alkali sulfid.

2. The process for the production of new sulfur coloring matters by condensing para-nitroso-phenol with carbazol and heating the resulting condensation product with sulfur and alkali sulfid.

3. The process for the production of new sulfur coloring matters by condensing nitrosoorthocresol with carbazol and heating the resulting condensation product with sulfur and alkali sulfid.

4. As new articles of manufacture the new sulfur coloring matters which can be obtained by heating with sulfur and alkali sulfid the compounds produced by condensing a para-nitroso-hydroxy compound with carbazol, which coloring matters consist when dry of from gray to dark powders which are soluble in hot sodium sulfid solution yielding yellow solutions which dye cotton substantively yielding blue to violet shades of exceptional fastness against the action of chlorin.

5. As a new article of manufacture the new sulfur coloring matter which can be obtained by heating with sulfur and alkali sulfid the compound produced by condensing para-nitroso-phenol with carbazol, which coloring matter consists, when dry, of a gray powder which is soluble in hot sodium sulfid solution yielding a yellow solution which dyes cotton substantively yielding blue shades of exceptional fastness against the action of chlorin.

In testimony whereof I have hereunto set my hand in the presence of two subscribing witnesses.

LOUIS HAAS.

Witnesses:
J. Alec. Lloyd,
Jos. H. Leute.